United States Patent [19]

Lew

[11] Patent Number: 4,762,025
[45] Date of Patent: Aug. 9, 1988

[54] ALL ORBITING GEAR PLANETARY DRIVE

[76] Inventor: Hyok S. Lew, 7890 Oak St., Arvada, Colo. 80005

[21] Appl. No.: 29,521

[22] Filed: Mar. 23, 1987

Related U.S. Application Data

[63] Continuation-in-part of Ser. No. 891,124, Jul. 31, 1986, and a continuation-in-part of Ser. No. 5,111, Jan. 20, 1987, and a continuation-in-part of Ser. No. 12,679, Feb. 9, 1987.

[51] Int. Cl.$^4$ .............................................. F16H 1/28
[52] U.S. Cl. ........................................ 74/804; 74/805
[58] Field of Search .................................. 74/804, 805

[56] References Cited

U.S. PATENT DOCUMENTS

| | | | |
|---|---|---|---|
| 987,430 | 3/1911 | Conant | 74/805 |
| 2,505,745 | 4/1950 | Sharpe | 74/804 X |
| 2,666,345 | 1/1954 | Amberg | 74/804 |
| 3,472,097 | 10/1969 | Huska | 74/804 X |
| 4,338,831 | 7/1982 | Rodaway | 74/805 |
| 4,621,543 | 11/1986 | Giabilondo | 74/805 |

Primary Examiner—Dirk Wright

[57] ABSTRACT

This invention discloses a gear drive for transmitting rotating motions from a first shaft to a second shaft rotatably disposed in line, which comprises a first rotary member including first and second sets of meshing surfaces of two different pitch diameters such as two sets of gear teeth which are rotatably mounted on a first eccentric section included in the first shaft; a second rotary member with a third set of meshing surfaces rotatably mounted on a second eccentric section included in the first shaft in an arrangement diametrically opposite to the first eccentric section, wherein the first and third meshing surfaces engage each other over an arc portion thereof; and a third rotary member with a fourth set of meshing surfaces rotatably mounted on a third eccentric section included in the first shaft in an arrangement diametrically opposite to the first eccentric section, wherein the second and fourth meshing surfaces engage each other over an arc portion thereof. The second rotary member is nonrotatably coupled to a stationary member disposed concentrically about the first shaft by a first coupling that allows a radial shifting motion therebetween, while the third rotary member is nonrotatably coupled to the second shaft by a second coupling that allows a radial shifting motion therebetween.

13 Claims, 2 Drawing Sheets 4,762,025

ALL ORBITING GEAR PLANETARY DRIVE

BACKGROUND OF THE INVENTION

This patent application is a continuation-In-Part application to patent applications Ser. No. 06/891,124 entitled "Orbiting ring gear planetary drive" filed on July 31, 1986 now allowed and Ser. No. 07/005,111 entitled "Stepwise variable speed planetary drive" filed on Jan. 20, 1987 still pending and to patent application Ser. No. 07/012,679 entitled "Dual Orbiting gear planetary drive" filed on Feb. 9, 1987, still pending.

As demonstrated by the "Sumitomo Cyclo-Drive" available in the present day gear reducer market, a planetary gear reducer of very compact size providing a high reduction ratio can be constructed by employing a planetary gear rotatably mounted on a first eccentric section included in the input shaft, which eccentric section has a very small off-set distance from the central axis of the input shaft, and a stationary internal ring gear coaxially disposed about the input shaft wherein the planetary gear engages the stationary internal ring gear over an arc portion thereof. The planetary gear is nonrotatably coupled to the output shaft disposed in line with the input shaft by a flex coupling that allows radial motions of small magnitude therebetween. In "Sumitomo Cyclo-Drive", the minimum eccentric distance between the central axis of the eccentric section and that of the input shaft is limited by the interference between gear teeth included in the planetary gear and the staionary internal ring gear. As a consequence, the "Sumitomo Cyclo-Drive" has to resort to a modified gear teeth design which provides a much smaller torque transfer capability compared with conventional gear teeth.

The parent patent application to the present patent application that is entitled "Dual orbiting gear planetary drive" filed on Feb. 9, 1987, discloses new principles teaching how to eliminate the problem of the gear teeth interference between the planetary gear and the internal ring gear. In place of the stationary internal ring gear coaxially disposed about the input shaft in "Sumitomo Cyclo-Drive", these new principles employ a planetary internal ring gear rotatably mounted on a second eccentric section included in the input shaft in an arrangement diagonally opposite to the first section rotatably supporting the planetary external gear, wherein the two planetary gears engage one another over an arc portion thereof. One of the two planetary gears is coupled to the output shaft by a first flex coupling, while the other of the two planetary gears is coupled to a stationary member coaxially disposed about the input shaft by a second flex coupling. As a consequence, these new principles taught by the parent patent application to the present patent application enable one to double the off-set dimension between the two planetary gears engaging one another without increasing the eccentric dimension between the central axis of the eccentric section and that of the input shaft and, consequently, one can employ gear teeth of a configuration providing much higher torque transfer capability compared with the modified gear teeth employed by the "Sumitomo Cyclo-Drive".

In the gear reducers of the aforementioned types, the reduction ratio is equal to the eccentric dimension divided by the pitch radius of the planetary external gear. In general, the minimum eccentric dimension is limited by the required torque transfer capability. Therefore, a planetary gear of a large diameter has to be employed to provide a high reduction ratio, which condition results in a gear reducer of a large radial dimension. While the gear reducers of the aforementioned types enable one to construct gear reducers of much smaller bulk, weight, and cost compared with the conventional planetary gear reducers as long as the reduction ratio is not very high, the answers provided by those gear reducers are less than complete when it comes to the gear reducers of very high reduction ratios.

BRIEF SUMMARY OF THE INVENTION

The primary object of the present invention is to provide a new generation planetary drive with small size and weight which provides medium to very high reduction ratios.

Another object is to provide a planetary drive with the minimum eccentric dimension between the central axis of the eccentric section of a first shaft rotatably supporting a planetary gear and that of the first shaft.

A further object is to provide a planetary drive comprising a first rotary member including first and second sets of meshing means such as gear teeth, which first rotary member of rotatably mounted on a first eccentric section included in a first shaft; a second rotary member with a third set of meshing means rotatably mounted on a second eccentric section of the first shaft arranged in a diametrically opposite relationship to the first eccentric section wherein the first and third sets of meshing means engage each other over an arc portion thereof; and a third rotary member with a fourth set of meshing means rotatably mounted on a third eccentric section of the first shaft arranged in a diametrically opposite relationship to the first eccentric section wherein the second and fourth sets of meshing means engage each other over an arc poriton thereof, wherein the second rotary member is nonrotatably coupled to a stationary member coaxially disposed about the first shaft by a first radially shiftable coupling and the third rotary member is nonrotatably coupled to a second shaft disposed in line with the first shaft by a second radially shiftable coupling.

Yet another object is to provide a planetary drive comprising a first planetary rotary member including two sets of meshing means and second and third planetary rotary members respectively including sets of meshing means wherein the meshing means include modified gear teeth.

Yet a further object is to provide a planetary drive comprising a first planetary rotary member with two sets of meshing means and second and third planetary rotary members respectively including sets of meshing means wherein each pair of meshing means includes a combination of rollers and sprocket teeth.

Still another object is to provide a planetary drive with a built in clutch.

Still a further object is to provide a planetary drive of low cost providing a high torque transfer capability.

These and other objects of the present invention will become clear as the description thereof proceeds.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
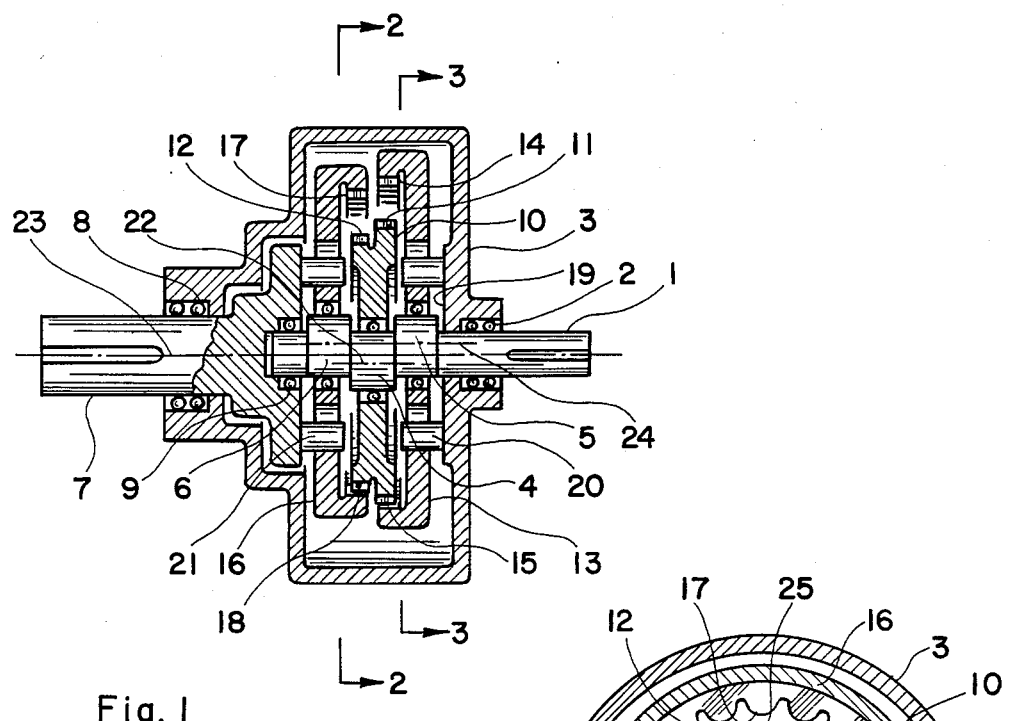
FIG. 1 illustrates a cross section of an embodiment of the all orbiting gear planetary drive constructed in accordance with the principles of the present invention.

In FIG. 1 there is illustrated a cross section of an embodiment of the all orbiting gear planetary drive constructed in accordance with the principles of the present invention, which cross section is taken along a plane including the common axis of the input and output shafts disposed in line. The first shaft 1 rotatably supported by a bearing 2 secured to the housing 3 includes a first eccentric section 4, and second and third eccentric sections 5 and 6 disposed in an arrangements generally diametrically opposite to the first eccentric section 4. The second shaft 7 disposed in line with the first shaft 1 is rotatably supported by a bearing 8 secured to the housing 3. The adjacent extremities of the two shafts 1 and 7 are further supported in a rotating relationship by the bearing 9. A first rotary member 10 including a first set of meshing means 11 and a second set of meshing means 12 such as external gear teeth or modified gear teeth, is rotatably mounted on the first eccentric section 4 of the first shaft 1. A second rotary member 13 including a third set of meshing means 14 such as internal gear teeth or modified gear teeth is rotatably mounted on the second eccentric section 5 of the first shaft 1, wherein the first set of meshing means 11 and the third set of meshing means 14 engage each other over an arc portion 15 thereof. A third rotary member 16 including a fourth set of meshing means 17, is rotatably mounted on the third eccentric section 6 of the first shaft 1, wherein the second set of meshing means 12 and the fourth set of meshing means 17 engage each other over an arc portion 18 thereof. The second rotary member 13 is nonrotatably coupled to a stationary member 19 coaxially disposed about the first shaft and forming a portion of the housing 3 by a coupling 20 such as a flex or radially shiftable coupling that allows relative motions of small magnitude in the radial directions between the second rotary member 13 and the stationary member 19. The third rotary member 16 is nonrotatably coupled to the second shaft 7 by a coupling 21 such as a flex or radially shiftable coupling that allows relative motions of small magnitude in the radial directions between the third rotary member 16 and the second shaft 7. It should be noticed that the combination of the rotary members and the couplings is completely enclosed within the housing 3. It should also be noticed that the central axis 22 of the first eccentric section 4 is off-set from the common central axis 23 of the first and second shafts 1 and 7 in one direction, while the central axis 24 of the second and third eccentric sections 5 and 6 is off set from the common central axis 23 in the other direction generally opposite to the aforementioned one direction.

Figure 2:
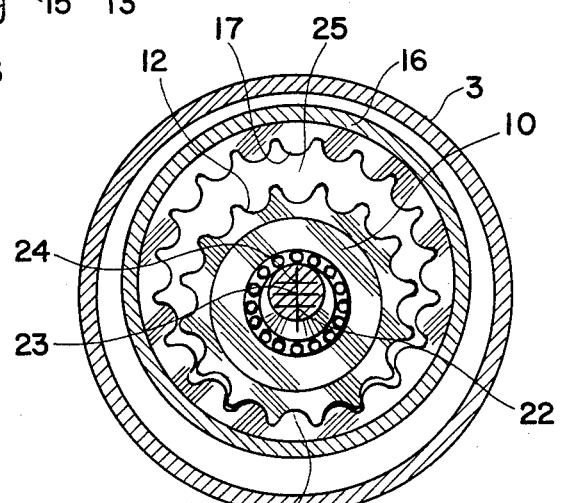
FIG. 2 illustrates another cross section of the embodiment shown in FIG. 1.

In FIG. 2 there is illustrated another cross section of the embodiment shown in FIG. 1, which cross section is taken along plane 2—2 as shown in FIG. 1. The second set of meshing means 12 such as modified external gear teeth, which is included in the first rotary member 10, is coaxially disposed about the central axis 22 of the first eccentric section rotatably supporting the first rotary member 10, while the fourth set of meshing means 17 such as modified internal gear teeth, which is included in the third rotary member 16, is coaxially disposed about the central axis 24 of the third eccentric section. It is easily recognized that the separation between the central axes 22 and 24 of the second and fourth meshing means is equal to two times the eccentric distance, that is, the distance between the central axes 23 and 24 or 23 and 22. At the engaging arc portion 18, the pitch circles of the second and fourth sets of meshing means 12 and 17 come to a tangential contact therebetween, while the two pitch circles are separated by a distance equal to four times the eccentric distance at the disengaging arc portion 25. As a consequence, gear teeth or modified gear teeth of greater height can be incorporated for the meshing engagement between the second and fourth sets of meshing means without creating interference. It should be mentioned that the engagement between the first and third meshing means 11 and 14 respectively included in the first and second rotary members 10 and 13 are arranged in essentially the same way as that illustrated in FIG. 2. The meshing means may comprise gear teeth or modified gear teeth as illustrated in FIG. 2 or combinations or sprocket teeth and rollers respectively included in two meshing means engaging one another.

Figure 3:
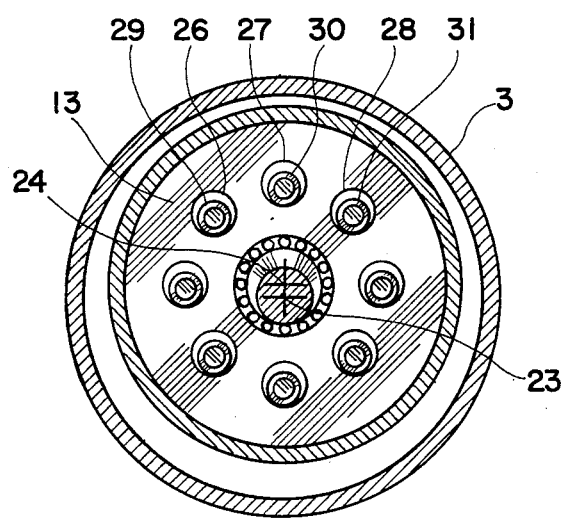
FIG. 3 illustrates a further cross section of the embodiment shown in FIG. 1.

In FIG. 3 there is illustrated a further cross section of the embodiment shown in FIG. 1, which cross section is taken along plane 3—3 as shown in FIG. 1. The coupling 20 that couples the second rotary member 13 to the stationary member 19 in a nonrotatable and radially shiftable relationship comprises a plurality of circular holes 26, 27, 28, etc. disposed through the hub of the second rotary member in an axisymmetric pattern about the central axis 24 of the second eccentric section 5 and a plurality of posts with sleeve bearings 29, 30, 31, etc. respectively engaging the plurality of circular holes 26, 27, 28, etc. in an eccentric relationship, wherein the posts are anchored to and extending from the stationary member 19 in an axisymmetric pattern about the central axis 23 of the first shaft 1. The difference between the inside diameter of the circular holes 26, 27, 28, etc. and the outside diameter of the sleeve bearings on posts 29, 30, 31, etc. has to be equal to two times the eccentric distance between the central axes 23 and 24. The coupling 21 that couples the third rotary member 16 and the second shaft 7 in a nonrotatable and radially shiftable relationship has essentially the same construction as the embodiment shown in FIG. 3 with one exception being that the posts with sleeve bearings are now anchored to and extending from a flange member nonrotatably secured to one extremity of the second shaft 7 adjacent to the first shaft 1. It should be mentioned that the particular embodiment of the coupling shown in FIG. 3 is one of many existing designs available to the skilled in the art and, consequently, other designs of flex or radially shiftable coupling may be employed in place of the particular embodiment shown in FIG. 3 in the construction of the all orbiting gear planetary drive of the present invention, which other designs include well known couplings such as the universal joint, elastic flex couplings, radially sliding flex couplings and other well known couplings for coupling two shaft under a slight misalignment. Therefore, the scope of claims of the present invention is not limited by the particular embodiment of the couplings or the particular geometry of the meshing means.

The all orbiting gear planetary drive of the present invention illustrated in FIGS. 1, 2 and 3 operates on the following principles : The rotation of the first shaft 1 produces an orbiting motion of the first rotary member 10 about the central axis 23 of the first shaft 1. Since the first set of meshing means 11 included in the first rotary member engages the third set of meshing means 14 included in the second rotary member that is prevented from rotating, the orbital motion of the first rotary member 10 about the central axis 23 of the first shaft generates a rotating motion of the first rotary member 10 about the central axis 22 of the first eccentric section 4. The fourth set of meshing means 17 included in the third rotary member 16 engages the second set of meshing means 12 included in the first rotary member 10 and, consequently, the rotating motion of the first rotary member 10 about the central axis 22 is transmitted to the rotating motion of the third rotary member 16 about the central axis 24 of the third eccentric section 6, which rotating motion of the third rotary member 16 is directly transmitted to the second shaft 7 by the coupling 21. The ratio of the angular velocity of the second shaft 7 to that of the first shaft 1 is given by equation $$\frac{\omega_2}{\omega_1} = \frac{\frac{R_2}{R_1} - 1}{\frac{R_2}{e} + 2}$$

where $\omega_1$ and $\omega_2$ are the angular velocities of the first and second shafts 1 and 7, respectively; e is the eccentric distance between the central axis of the first shaft and that of the eccentric sections; and $R_1$ and $R_2$ are the pitch radius of the first set of meshing means 11 and that of the second set of meshing means 12, respectively. It is noticed from this equation that the high reduction ratio can be obtained by employing an eccentric distance e of very small value or by employing a combination of $R_1$ and $R_2$ with numerical values very close to each other. In other words, the all orbiting gear planetary drive provides a high reduction ratio without requiring the use of a planetary gear of a large pitch diameter.

Figure 4:
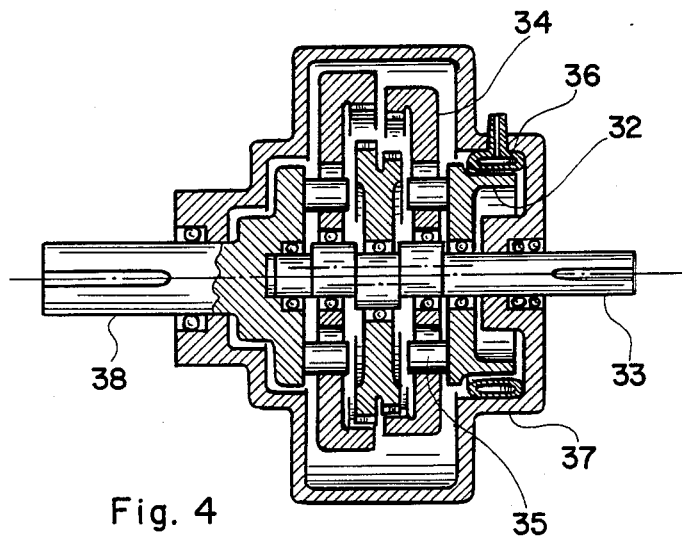
FIG. 4 illustrates a cross section of another embodiment of the all orbiting gear planetary drive of the present invention that includes a built-in clutch.

In FIG. 4 there is illustrated a cross section of another embodiment of the all orbiting gear planetary drive of the present invention, which has essentially the same construction as the embodiment shown in FIGS. 1, 2 and 3 with one exception, which is the built-in clutch included in this embodiment. In place of the stationary member 19 coupled to the second rotary member 13 by the radially shiftable coupling 20 as shown in FIG. 1, this embodiment includes a fourth rotary member rotatably mounted on the first shaft 33, which fourth rotary member 32 is coupled to the second rotary member 34 equivalent to the element 13 shown in FIG. 1 by a coupling 35 that nonrotatably couples the second rotary member 34 to the fourth rotary member 32 in a radially shiftable arrangement. A braking means 36 such as an inflatable tube brake affixed to the housing 37 stops or allows the fourth rotary member 32 to rotate freely. When the braking means 36 is activated, the rotating motion of the first shaft 33 is transmitted to the second shaft 38 in accordance with the same relationship as that described in conjunction with FIGS. 1, 2 and 3. When the braking means 36 is deactivated, no rotating motion is transmitted to the second shaft 38 as all of the rotating motion of the first shaft 33 leaks to the fourth rotary member 32 that is now allowed to rotate freely.

Figure 5:
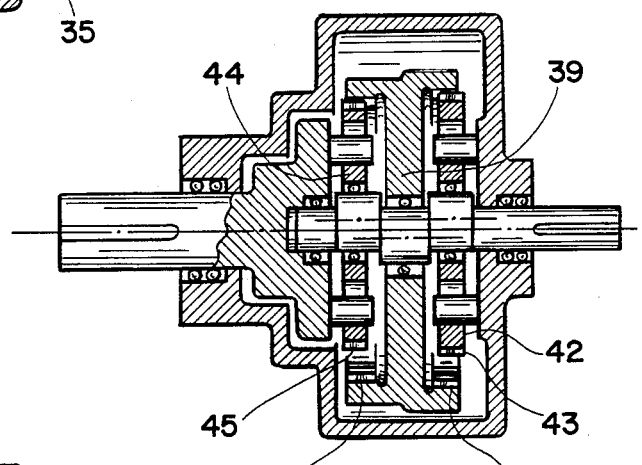
FIG. 5 illustrates a cross section of a further embodiment of the all orbiting gear planetary drive of the present invention.

In FIG. 5 there is illustrated a cross section of yet another embodiment of the all orbiting gear planetary drive having essentially the same construction and operating on the same principles as the embodiment shown in FIGS. 1, 2 and 3. In this embodiment, the first rotary member 39 includes a first set of meshing means 40 comprising internal gear teeth and a second set of meshing means 41 also comprising internal gear teeth. The second rotary member 42 includes a third set of meshing means 43 comprising external gear teeth which engage the internal gear teeth 40 of the first rotary member 39. The third rotary member 44 includes a fourth set of meshing means 45 comprising external gear teeth which engage the internal gear teeth 41 of the first rotary member 39. It is clear that the embodiment shown in FIG. 5 may include a built-in clutch as illustrated in FIG. 4, which requires a straight forward modification as shown in FIG. 4 in comparison with FIG. 1.

Figure 6:
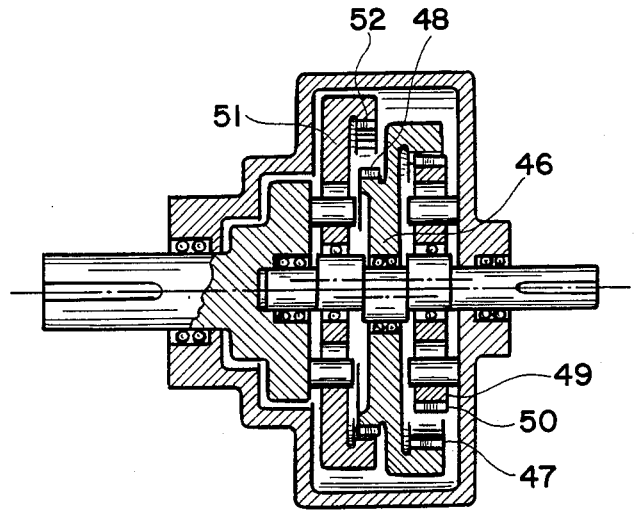
FIG. 6 illustrates a cross section of yet another embodiment of the all orbiting gear planetary drive of the present invention.

In FIG. 6 there is illustrated a cross section of yet a further embodiment of the all orbiting gear planetary drive of the present invention, which differs from those embodiments shown in FIGS. 1 and 5 only by the internal or external nature of the meshing means. The first rotary member 46 includes a first set of meshing means 47 comprising internal gear teeth and a second set of meshing means 48 comprising external gear teeth. The second rotary member 49 includes a third set of meshing means 50 comprising external gear teeth which engage internal gear teeth 47 of the first rotary member 46, while the rotary member 51 including a fourth set of meshing means 52 comprising internal gear teeth which engage the external gear teeth 48 of the first rotary member 46. It is self evident that still another embodiment of the all orbiting gear planetary drive can be obtained from that shown in FIG. 6 by changing internal gears to external gears and external gears to internal gears. By incorporating the same modification from FIG. 1 to FIG. 4, one may include a built-in clutch in the embodiment shown in FIG. 6.

It should be understood that the specific designs defining the shape of the meshing means and the internal or external nature thereof as well as the particular designs of the couplings providing nonrotatable and radially shiftable coupling included in the construction of the all orbiting gear planetary drive are considered as matters of design, as the true novelty of the all orbiting gear planetary drive lies in the arrangement wherein every gear orbits. While the principles of the present invention have now been made clear by the illustrated embodiments there will be immediately obvious to those skilled in the art many modifications of the structures, arrangements, proportions, elements and materials which are particularly adapted to the specific working environments and operating conditions in the practice of the invention without departing from those principles.

I claim:

1. An apparatus for transmitting rotating motions from a power input member to a power output member comprising in combination:
   (a) a frame;
   (b) a power output member of generally axisymmetric construction rotatably secured to the frame;

(c) a power input shaft disposed in line with the power output member and rotatably secured to the frame, said shaft including a first eccentric section, a second eccentric section and a third eccentric section, wherein said second and third eccentric sections are disposed in generally diametrically opposite relationship to said first eccentric section;

(d) a first rotary member rotatably mounted on said first eccentric section of said shaft, said first rotary member including a first set of meshing means of a first pitch diameter coaxially disposed about the central axis of said first eccentric section and a second set of meshing means of a second pitch diameter coaxially disposed about the central axis of said first eccentric section;

(e) a second rotary member rotatably mounted on said second eccentric section of said shaft, said second rotary member including a third set of meshing means coaxially disposed about the central axis of said second eccentric section; wherein said first set of meshing means engages said third set of meshing means over an arc portion thereof;

(f) a third rotary member rotatably mounted on said third eccentric section of said shaft, said third rotary member including a fourth set of meshing means coaxially disposed about the central axis of said third eccentric section; wherein said second set of meshing means engages said fourth set of meshing means over an arc portion thereof;

(g) a first coupling nonrotatably coupling said third rotary member to the power output member in a radially shiftable relationship therebetween; and (h) a second coupling nonrotatably coupling said second rotary member to the frame in a radially shiftable relationship therebetween.

2. The combination as set forth in claim 1 wherein said meshing means comprise gear teeth.

3. The combination as set forth in claim 1 wherein said meshing means comprise modified gear teeth.

4. The combination as set forth in claim 1 wherein each pair of said meshing means engaging one another respectively comprise sprocket teeth and a plurality of rollers.

5. An apparatus for transmitting rotating motions from a power input member to a power output member comprising in combination:

(a) a frame;

(b) a power output member of generally axisymmetric construction rotatably secured to the frame;

(c) a power input shaft disposed in line with the power output member and rotatably secured to the frame, said shaft including a first eccentric section, a second eccentric section and a third eccentric section, wherein said second and third eccentric sections are disposed in generally diametrically opposite relationship to said first eccentric section;

(d) a first rotary member rotatably mounted on said first eccentric section of said shaft, said first rotary member including a first set of meshing means of a first pitch diameter coaxially disposed about the central axis of said first eccentric section and a second set of meshing means of a second pitch diameter coaxially disposed about the central axis of said first eccentric section;

(e) a second rotary member rotatably mounted on said second eccentric section of said shaft, said second rotary member including a third set of meshing means coaxially disposed about the central axis of said second eccentric section; wherein said first set of meshing means engages said third set of meshing means over an arc portion thereof;

(f) a third rotary member rotatably mounted on said third eccentric section of said shaft, said third rotary member including a fourth set of meshing means coaxially disposed about the central axis of said third eccentric section; wherein said second set of meshing means engages said fourth set of meshing means over an arc portion thereof;

(g) a first coupling nonrotatably coupling said third rotary member to the power output member in a radially shiftable relationship therebetween; and (h) a second coupling nonrotatably coupling said second rotary member to a fourth rotary member rotatably mounted on said shaft in a radially shiftable relationship therebetween.

6. The combination as set forth in claim 5 wherein said combination includes a braking means for preventing said fourth rotary member from rotating when said braking means is activated and for allowing said fourth rotary member to rotate generally freely when said braking means is deactivated.

7. The combination as set forth in claim 6 wherein said meshing means comprise gear teeth.

8. The combination as set forth in claim 6 wherein said meshing means comprise modified gear teeth.

9. The combination as set forth in claim 6 wherein each pair of said meshing means engaging one another respectively comprise sprocket teeth and a plurality of rollers.

10. The combination as set forth in claim 5 wherein said combination includes means for nonrotatably connecting said fourth rotary member to the frame and disconnecting said fourth rotary member from the frame.

11. The combination as set forth in claim 10 wherein said meshing means comprise gear teeth.

12. The combination as set forth in claim 10 wherein said meshing means comprise modified gear teeth.

13. The combination as set forth in claim 10 wherein each pair of said meshing means engaging one another respectively comprise sprocket teeth and a plurality of rollers.

* * * * *